Aug. 7, 1934.  D. J. JONES  1,969,136
CONTROL SYSTEM FOR STOKER MOTORS
Filed July 18, 1930
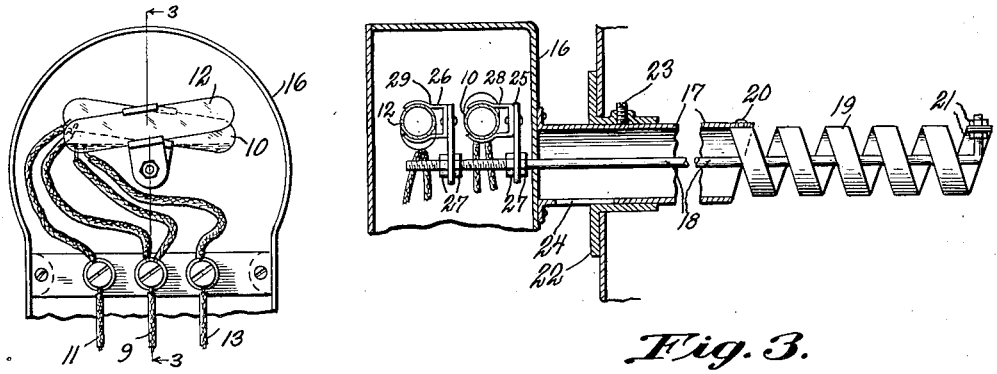
Fig. 2.   Fig. 3.
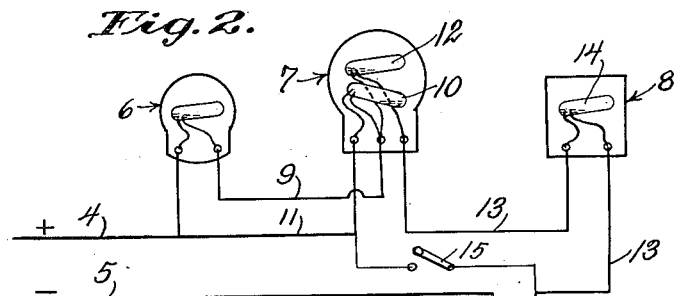
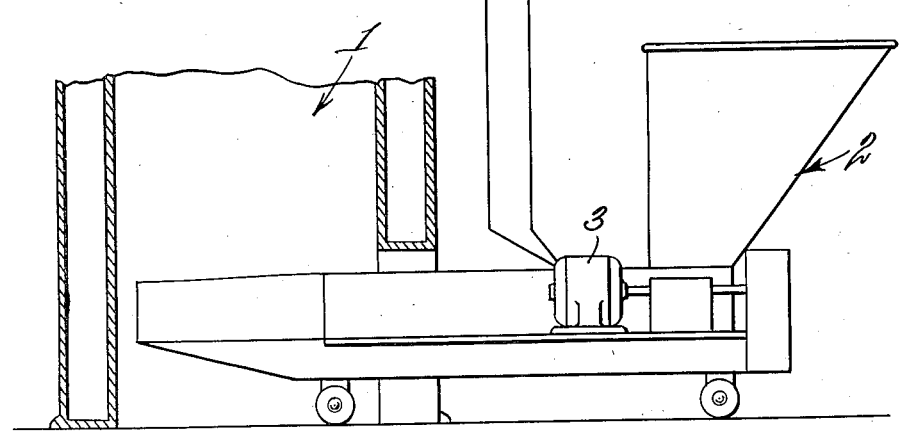
Fig. 1.
Inventor:
David J. Jones,
By
Jones, Addington, Ames & Seibold
Attorneys.

Patented Aug. 7, 1934

1,969,136

UNITED STATES PATENT OFFICE

1,969,136

CONTROL SYSTEM FOR STOKER MOTORS

David J. Jones, Elmhurst, Ill., assignor, by mesne assignments, to Minneapolis-Honeywell Regulator Company, Minneapolis, Minn., a corporation of Delaware Application July 18, 1930, Serial No. 468,889

3 Claims. (Cl. 236—9)

My invention relates to control systems for stoker motors, and more particularly to a means for controlling the intermittent operation of the stoker motor relative to the room temperature, the furnace temperature and the temperature of the room-heating medium.

My invention is especially adapted for use in connection with heating plants using hot water, steam or a similar heating medium, in connection with a furnace, in which latter a suitable fuel, such as coal, is automatically fed by means of a suitable stoker.

The present invention contemplates a control system for a stoker motor in which the intermittent operation of the motor for operating the stoker is automatically controlled from a suitable power circuit by means of a control circuit embodying certain switching means including a room thermostat operable by room temperatures, a flue thermostat or stack-switch controlled by the temperature of the furnace stack or flue, and a limit switch controlled by the temperature or the pressure of the heating medium.

The above-mentioned control devices are so arranged in the motor circuit that the room thermostat will operate to close the motor circuit to operate the stoker when the room temperature falls below a certain predetermined degree, if the stack or flue temperature is below a certain predetermined high degree and the limit control switch indicates that the heating medium is in a predetermined condition.

The temperature of the heating medium controls the limit switch to make the operation of the room thermostat and the stack-switch ineffective when the heating medium is hot water and is above a predetermined temperature; that is, when the temperature of the heating medium is above a predetermined degree the limit control switch operates to break the motor circuit and to retain it broken under all conditions until the heating medium temperature again drops below the predetermined degree. In case steam is used, the limit switch may be similarly controlled by a predetermined steam pressure.

It is also an object of the invention to provide a device for the cooperative control of the intermittent operation of the stoker motor through the room temperature, the flue temperature and condition of the heating medium.

A further object is the provision of means whereby the stack-switch may control the operation of the stoker motor through a low temperature differential independent of the room thermostat.

Other objects and advantages of the invention will appear from a consideration of the following detailed description in conjunction with the accompanying drawing, in which:

Figure 1 is a conventional diagrammatic view indicating a heating plant and motor-operated stoker, together with the wiring diagram and elements connected therein for controlling the operation of the motor;

Fig. 2 is a front view of a suitable thermostatically-controlled stack-switch including a plurality of switches controlled by the temperature of the furnace stack or flue; and Fig. 3 is a longitudinal detail sectional view through the stack-switch taken on a line corresponding to line 3—3 of Fig. 2.

Referring to the drawing in detail, the embodiment illustrated comprises a furnace 1 having a stoker 2 in cooperation therewith, the stoker being operable by means of a motor 3. The stoker may be of any suitable construction for feeding fuel to the furnace as needed. The motor is connected to an ordinary power circuit comprising conductors 4 and 5. The conductor 5 is connected directly to the motor, and in the present instance the temperature controlled elements are connected in the circuit from the conductor 4 and include a room thermostat 6, a thermostatically-controlled stack-switch 7 and a limit-control switch 8. The room thermostat is installed in the space to be heated and may be of any conventional type, designed to make or break the circuit therethrough at a predetermined temperature.

In order to control the stoker motor to maintain a fairly uniform room temperature, the stack-switch 7 is installed in the stack or flue of the furnace and is provided with thermostatic means for operating a plurality of switches. In the present instance two are employed, one of which is designed to be operated to close the circuit for cooperation through the room thermostat to control the operation of the motor when the furnace temperature drops below a certain predetermined high degree, the other switch being automatically operable to control the operation of the motor independently of the room thermostat when the furnace temperature drops below a predetermined low degree. The effective control of the motor through the operation of the stack switch and the room thermostat, of course, is dependent upon the position of the limit-control switch, which is operable to close the circuit relative to the temperature of the heating medium.

In the wiring diagram in Fig. 1, I have illustrated all of the switches of a mercury contactor type comprising closed glass tubes or capsules having a small amount of mercury therein, into which the ends of the conductors extend at one end of the contactor. When the contactors are tilted in one direction, the mercury will flow to the lower end and the circuit contacts will be closed, and when the contactor is tilted in the opposite direction the mercury will flow to the opposite end and the circuit will be broken, the movement of the contactors being controlled by suitable thermostatic elements.

The room thermostat 6 is illustrated with the switch in closed position, which indicates that the room temperature is below a predetermined degree. This room thermostat is connected to the power conductor 4 and to each of the contactors in the stack-switch by means of a conductor 9 connected to the stack-switch 7. A contactor 10 is connected to the power circuit 4 through a conductor 11, the opposite side being connected to the room thermostat through the conductor 9. The contactor 10 is the low temperature switch; that is, when the temperature in the stack drops to a predetermined low degree the contactor will be tilted to close the circuit.

A contactor 12, operable from the same thermostat means operating the contactor 10, is connected in series with the room thermostat and the limit-control switch 8 through the conductor 9 and a conductor 13, and operates to break the circuit through these conductors and maintain it broken when the stack temperature reaches and maintains a predetermined high degree. The limit-control switch 8 is provided with a similar contactor member 14, which is arranged to break the motor circuit through the conductor 13 when the heating medium reaches a predetermined degree or pressure and to maintain the circuit broken until the temperature or pressure drops below the predetermined point.

If desired, the stoker motor 3 may be operated independently of any of the temperature controlled devices by means of a switch 15 which may be used to shunt the control devices and to connect the motor directly to the power circuit as illustrated.

One embodiment of the stack-switch is illustrated in Figs. 2 and 3, and comprises a thermoelectric device having a casing 16 with a rearwardly extending sleeve 17 secured thereto having a longitudinal rotatably-mounted shaft 18 extending therethrough. A thermostatic element 19 is secured to the sleeve 17 at 20 and is preferably in the form of an outwardly extending helical bimetallic coil, the outer end of which is secured to the upwardly extending end of the shaft 18 by means of securing nuts 21. The stack-switch is mounted on the furnace in such a manner that the thermostatic element 19 will be controlled relative to the temperature in the stack.

A bracket 22 is secured to the furnace wall and the sleeve 17, which is slidably mounted therein, may be secured in adjusted position by means of a set screw 23. When the temperature in the furnace rises, the expansion of the thermostatic element will cause the shaft 18 to rotate in a clockwise direction and as the temperature falls it will rotate in a counter-clockwise direction.

The sleeve 17 is apertured at 24 to permit a certain amount of cold air to be drawn through the sleeve for the purpose of ventilating the thermostatic member 19. The amount of air drawn in by reason of the draft inside the stack may be regulated by adjusting the sleeve member until the desired control of the thermostatic member is obtained. This regulation is desirable so that the thermostatic member will respond to the desired combustion conditions within the combustion chamber of the heating system.

Upwardly extending contactor supporting arms 25 and 26 are secured on the shaft 18, the outer end of the shaft being threaded and the contactor arms adjustably secured in position by means of lock nuts 27. The mercury electric contactors 10 and 12 are mounted on the arms 25 and 26 respectively, by means of suitable clips 28 and 29 secured to the arms. These contactors, as previously described, are preferably in the form of closed glass tubes or capsules forming containers for a small amount of mercury therein for making or breaking the circuit between suitable electrodes in accordance with the angle of inclination of the movable containers, the angular movement being controlled by the expansion and the contraction of the thermostatic element 19 and the consequent rotation of the shaft 18.

With the contactors in the position illustrated in Figs. 2 and 3, if the temperature rises the contactors will be moved in a clockwise direction and the circuit through the contactor 10 will remain broken and the circuit through the contactor 12 will be broken as soon as the temperature rises sufficiently to tilt the contactor 12 in the opposite direction from that shown. In case the temperature falls, the contactors will be rotated in an anti-clockwise direction and the circuit through the contactor 12 will remain closed and the circuit through the contactor 10 will also be closed as soon as the temperature reaches a predetermined low degree. The time at which these circuits are broken or closed may be controlled by adjusting the radial position of the contactor-supporting arms 25 and 26 on the rotatable shaft 18.

Referring now to Fig. 1, when the room thermostat 6 calls for heat the circuit therethrough will be closed and the motor will be operated through the power lines 4 and 5 and the conductors 9 and 13, if the stack-switch contactor 12 is in a position to complete the circuit therethrough, the latter position indicating that the combustion in the furnace and consequent furnace temperature is below a predetermined high degree, and if the limit-control switch 8 is closed, indicating that the heating medium is in a predetermined desired position.

However, in case the stack-switch contactor 12 is in a position to retain the circuit broken, due to high combustion heat in the furnace, the room thermostat will remain ineffective to operate the motor, but if the temperature is below the desired degree, the contactor 12 will be in a position to allow the room thermostat to be effective to operate the motor and fuel to be fed to the combustion chamber.

On comparatively warm days or under certain conditions, the room temperature may remain comparatively high, thus preventing the room thermostat from controlling the operation of the circuit, and the fire in the combustion chamber might become extinguished. In such cases, the reduced temperature in the heating plant causes the mercury contactor 10 to close the circuit therethrough at a predetermined low temperature and the motor 3 will then be operated independently of the room thermostat 6 through the power circuit 4 and 5, and the conductor 11 through the mercury contactor 12 and the conductor 13.

It will be understood that none of the above operations will be effective to control the motor unless the heating medium limit switch and contactor 14 therein is in a position to maintain the circuit closed through conductor 13, indicating that the heating medium is in the desired condition.

From the foregoing description, it will be obvious to those skilled in the art that various modifications and alterations may be made without departing from the spirit and scope of the invention.

I claim:

1. In combination, a heating furnace comprising a fire-box in which fuel is burned, heat transferring surfaces over which the hot products of combustion from the fire-box pass and a stack flue through which the hot gases from the fire-box escape after passing over the heat transferring surfaces, and motor driven means for effecting combustion of fuel in said fire-box, and a power circuit adapted to supply operating power to said motor driven means, and a thermostat actuated by the temperature in an enclosed space to be heated adapted to close said power circuit when the temperature in said space falls below a predetermined minimum and to open it when the temperature therein rises above a predetermined maximum, and a thermostat actuated by the temperature in said stack flue adapted to close said power circuit when the temperature in said stack flue falls below a predetermined minimum independently of the operation of said first mentioned thermostat.

2. The combination with a heating furnace for burning solid fuel and a stack flue for said furnace, of means for controlling the rate of combustion of the fuel in said furnace, a first thermostat in control of said combustion-controlling means for increasing and decreasing the rate of combustion in accordance with temperature variations at said first thermostat, a second thermostat responsive to the temperature in said stack flue, and connections between said second thermostat and combustion-controlling means for causing the rate of combustion to be increased whenever the temperature in the stack flue falls to a predetermined minimum irrespective of the temperature at said first thermostat.

3. The combination with a heating furnace for burning solid fuel and a stack flue for said furnace, of means for controlling the feeding of fuel to said furnace, a first thermostat in control of said means for controlling the feeding of fuel to said furnace in accordance with temperature variations at said first thermostat, a second thermostat responsive to the temperature in said stack flue, and connections between said second thermostat and fuel feed controlling means for causing fuel to be fed to said furnace whenever the temperature in the stack flue falls to a predetermined minimum irrespective of the temperature at said first thermostat.

DAVID J. JONES.